United States Patent [19]

Tanaka et al.

[11] Patent Number: 4,993,998
[45] Date of Patent: Feb. 19, 1991

[54] POWER TRANSMISSION BELT AND DRIVE

[75] Inventors: Hiroyuki Tanaka; Takaji Nagai; Takahide Mizuno, all of Kobe; Yasuhiro Hashimoto, Miki; Kazumi Kawai, Kobe; Hideo Hirai, Kakogawa, all of Japan

[73] Assignee: Mitsuboshi Belting Ltd., Japan

[21] Appl. No.: 296,235

[22] Filed: Jan. 12, 1989

[30] Foreign Application Priority Data

Jan. 13, 1988 [JP] Japan .................................... 63-6426

[51] Int. Cl.$^5$ ................................................ F16G 1/28
[52] U.S. Cl. .................................................. 474/205
[58] Field of Search ............................ 474/203–205, 474/153, 154, 250, 251

[56] References Cited

U.S. PATENT DOCUMENTS 4,515,577  5/1985  Cathey et al. .................. 474/205 X
4,840,608  6/1989  Araki et al. ..................... 474/205

Primary Examiner—Thuy M. Bui
Attorney, Agent, or Firm—Wood, Phillips, Mason, Recktenwald & VanSanten

[57] ABSTRACT

A toothed belt power transmission system having a belt tooth configuration and pulley groove configuration providing for clearances between the belt tooth root and pulley groove outer surface, and between the belt tooth tip surface and pulley groove inner surface. A power transmitting surface on a midportion of the tooth has facial engagement with a confronting sidewall surface at the midportion of the pulley groove side surface. Locations of the centers of the different arcuate surfaces of the pulley tooth and belt groove for providing the extended life, low noise operation of the drive are disclosed. A number of different constructions embodying the invention are disclosed.

3 Claims, 2 Drawing Sheets

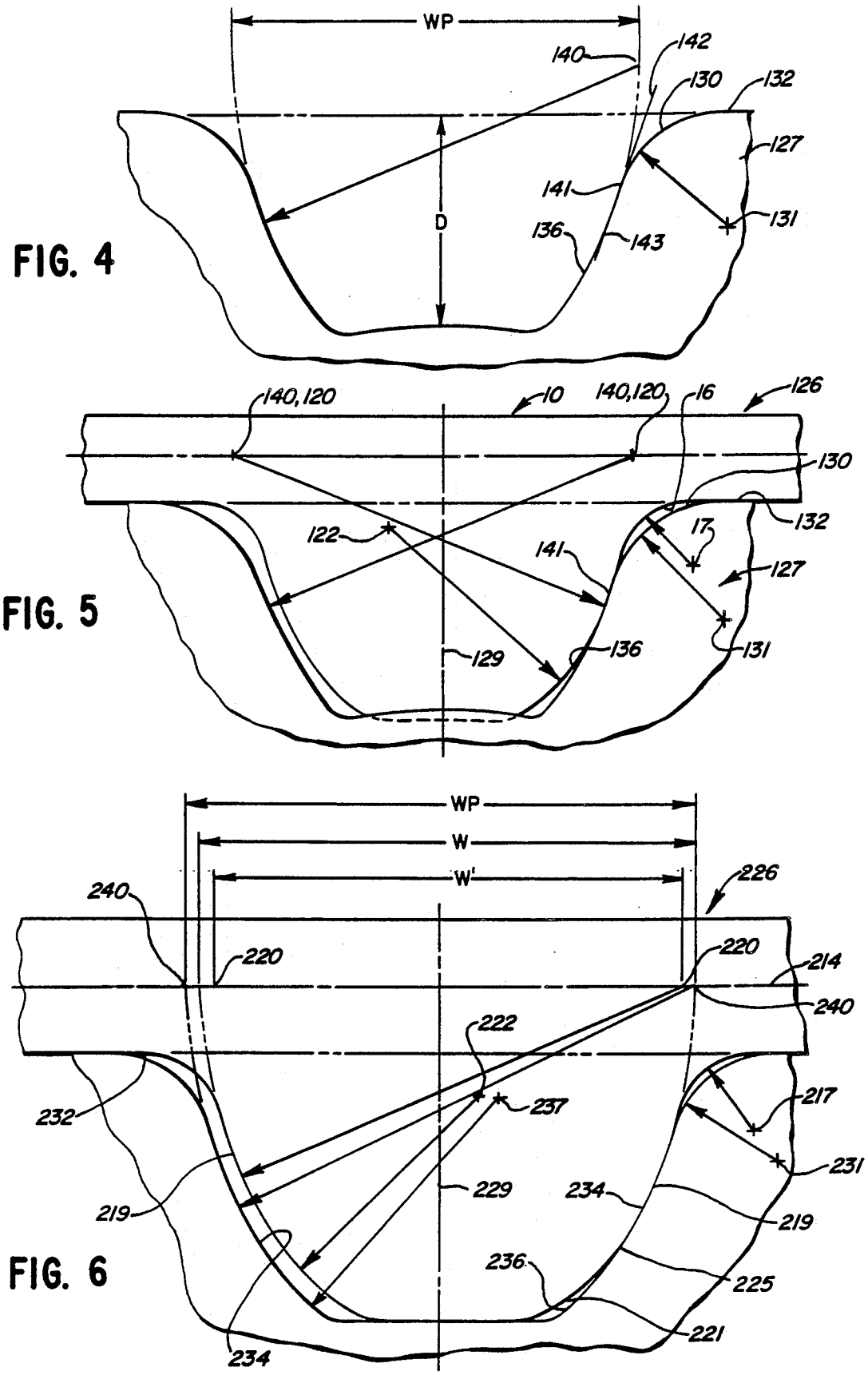

POWER TRANSMISSION BELT AND DRIVE

TECHNICAL FIELD

This invention relates to power transmission drives and in particular to toothed belts and pulleys used in such drives.

BACKGROUND ART

In the conventional toothed belt drive system, a flexible toothed belt is engaged with a pulley in complementary radially outwardly opening grooves thereof. A problem arises in such belt drives in that noise is produced by the belt teeth as they engage and disengage from the pulley during the operation of the drive.

One conventional form of toothed drive system utilizes pulley teeth having a trapezoidal cross section and complementary trapezoidal cross section pulley grooves.

A number of other tooth-and-pulley groove configurations have been utilized in an effort to abate the vexatious noise problem, but none has proven completely successful.

DISCLOSURE OF INVENTION

The present invention comprehends an improved toothed belt and cooperating pulley drive system providing substantially improved noise abatement, with long, troublefree life in the use of the belt drive system in transmitting high loads.

The toothed belt drive system of the present invention permits the belt tooth to smoothly engage and disengage from the sidewalls of the pulley grooves, notwithstanding the transmission of high load forces therebetween, while effectively avoiding noise.

In the illustrated embodiments of the invention, the belt tooth has force-transmitting engagement with a portion of one sidewall surface of the pulley groove, while the opposite side of the belt tooth has clearance substantially along its entire length.

A clearance may be provided between the pulley and the belt tooth at the root portion of the belt tooth and at the distal inner end thereof.

The belt tooth, in one form, has a length greater than the depth of the pulley groove, whereby the belt tooth is under compression when fully received in the pulley groove, while yet maintaining the clearance between the nonforce-transmitting surface of the belt tooth and pulley groove sidewall.

The tooth-and-pulley groove constructions are such as to avoid rubbing of the root portion of the belt tooth with the pulley at the other end of the groove as the belt tooth is removed from the pulley in the operation of the drive.

By eliminating rubbing and excessive deflection of the belt tooth, a long, troublefree life of the belt under high loads is obtained, with minimum noise.

In the illustrated embodiment, the power transmission toothed belt includes a belt body defining a longitudinal pitch line, a plurality of longitudinally spaced teeth projecting inwardly from the body, each tooth being symmetrical about an axis perpendicular to the pitch line, each half of each tooth having a concave root surface defined by an arc of a circle, the bottom of the root surface defining a belt land line, a convex power transmitting surface extending inwardly from the root surface and being defined by an arc of a circle having a radius centered on the pitch line, and a convex tip surface extending inwardly from the power transmitting surface and being defined by an arc of a circle having a radius centered in the tooth and being smaller than the radius of the circle defining the power transmitting surface.

The power transmitting surface defines a junction with the root surface spaced inwardly from the belt land line approximately one-fourth the height of the tooth inwardly from the belt land line.

The power transmitting surface further defines a junction with the tip surface spaced inwardly from the belt land line in the range of approximately one-half to two-thirds the height of the tooth inwardly from the belt land line.

The power transmitting surface is substantially tangent to the tip surface at a junction of the power transmitting surface with the tip surface.

In the illustrated embodiment, the belt tooth is further defined by a flat distal inner end surface extending transversely to the tooth axis.

In one embodiment, the belt tooth is defined by an arcuate distal inner end surface extending transversely to the tooth axis.

The belt is utilized in a power transmission toothed belt device further including a pulley having a plurality of circumferential, radially outwardly opening grooves, each groove being symmetrical about a radial centerline, each half of each groove having a convex outer surface defined by an arc of a circle extending inwardly from a radially outer face line defined by the distal face of a land between successive pulley grooves, a concave sidewall surface extending inwardly from the outer surface and being defined by a radius centered on a line coincident with the pitch line of the belt when a belt tooth is fully meshed with the pulley in the groove, and a concave inner surface extending inwardly from the sidewall surface and being defined by an arc of a circle having a radius centered in the groove and being smaller than said radius of the circle defining the sidewall surface, the belt tooth and pulley groove being constructed such that the belt tooth root surface has clearance with the pulley groove outer surface, the belt tooth power transmitting surface has facial engagement with the pulley groove sidewall surface, and the belt tooth tip surface has clearance with the pulley groove inner surface inwardly from the sidewall surface when the belt tooth is fully received in the pulley groove with the belt tooth power transmitting surface engaging the pulley groove sidewall surface.

The radius of the circle defining the belt tooth power transmitting surface may be substantially equal to the radius of the circle defining the pulley groove sidewall surface.

The radius of the circle defining the belt tooth power transmitting surface may be smaller than the radius of the circle defining the pulley groove sidewall surface.

The radius of the circle defining the pulley groove inner surface may be greater than the radius of the circle defining the belt tooth tip surface.

The height of the belt tooth inwardly from the tooth belt land line is greater than the depth of the pulley groove inwardly from the tooth distal face line.

In the illustrated embodiment, the pulley groove further defines an outwardly convex bottom transverse surface.

The invention comprehends that the belt tooth and pulley groove be constructed such that the opposite side of the belt tooth is entirely spaced from the pulley groove surface when the power transmitting surface of one side of the belt tooth is engaged with the confronting pulley groove sidewall surface.

In one form, the invention comprehends the provision of the side surface of the pulley groove as including a planar surface extending inwardly from the convex outer surface thereof, the planar surface being defined by a tangent to the inner sidewall surface at a point thereon spaced inwardly from the face line substantially one-half the depth of the groove inwardly from the face line.

In the illustrated embodiment, the center of the arc defining the convex outer surface is spaced from the face line more than one-half the depth of the pulley groove from the face line.

The center of the pulley convex outer surface arc is spaced from the pulley groove radial centerline and the face line a distance greater than the spacing of the center of the belt tooth concave root surface from the pulley groove radial centerline and the face line respectively.

The radius of the arc defining the convex power transmitting surface has a length less than the width of the tooth as measured along the pitch line between the intersection therewith of the arcs defining the opposite power transmitting surfaces of the tooth.

The radius of the pulley convex outer surface arc is greater than the radius of the belt tooth concave root surface arc in the illustrated embodiment.

The belt tooth engages the pulley groove sidewall surface in entering into the pulley groove for transmission of drive force therebetween, and moves smoothly from the pulley groove without rubbing the sidewall of the belt tooth for improved freedom from wear and noise.

More specifically the invention comprehends a drive pulley having a plurality of circumferential radially outwardly opening grooves, each groove defining a radial centerline and being symmetrical about the centerline, the opposite halves of each groove at opposite sides of the centerline each having a convex outer surface defined by an arc of a circle extending inwardly from a radially outer face line defined by the distal face of a land between successive pulley grooves, a concave sidewall surface extending inwardly from the outer surface and being defined by a radius centered on a line coincident with said pitch line of the belt when a belt tooth is fully meshed with the pulley in the groove, and a concave inner surface extending inwardly from the sidewall surface and being defined by an arc of a circle having a radius centered in the groove and being smaller than the radius of the circle defining said sidewall surface.

Further more specifically the invention comprehends the further provision of a planar surface extending inwardly from the convex outer surface, said planar surface being defined by a tangent to said inner side wall surface at a point thereon spaced inwardly from said face line substantially one-half the depth of the groove inwardly from said face line.

The toothed belt power transmission drive system of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 4 is a fragmentary side elevation showing a modified form of pulley embodying the invention;

FIG. 5 is a side elevation illustrating the meshing of the belt of FIG. 1 with the pulley of FIG. 4; and FIG. 6 is a fragmentary side elevation illustrating a meshed association of a modified form of belt and pulley embodying the invention.

BEST MODE OF CARRYING OUT THE INVENTION

Figure 1:
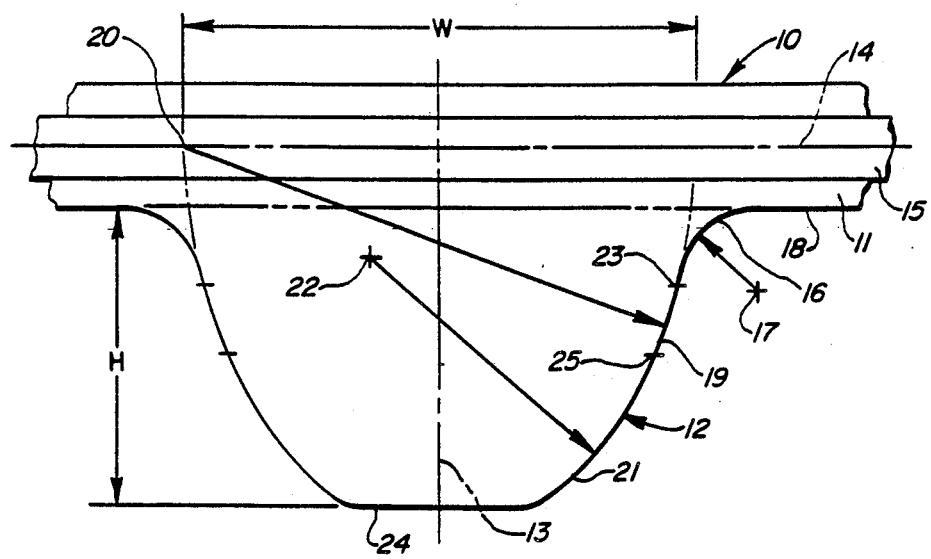
FIG. 1 is a fragmentary side elevation of a power transmission belt embodying the invention.
Figure 2:
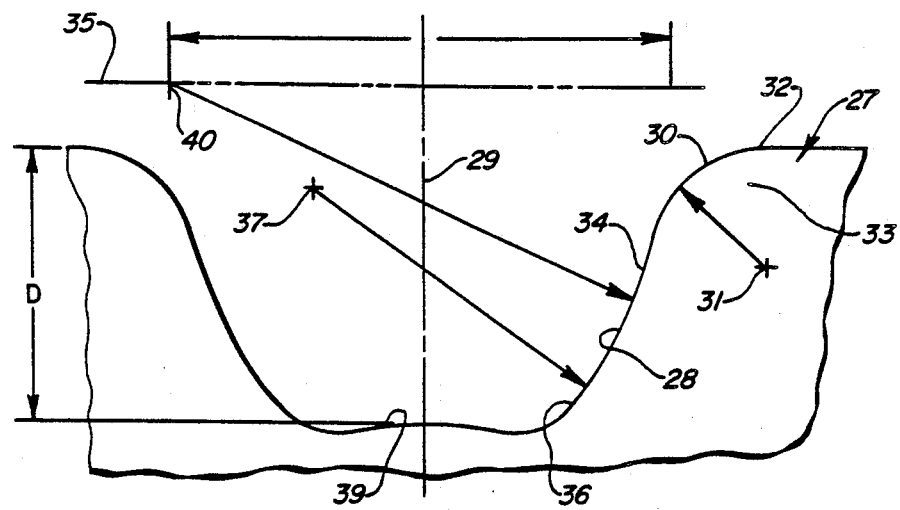
FIG. 2 is a fragmentary side elevation of a pulley embodying the invention.
Figure 3:
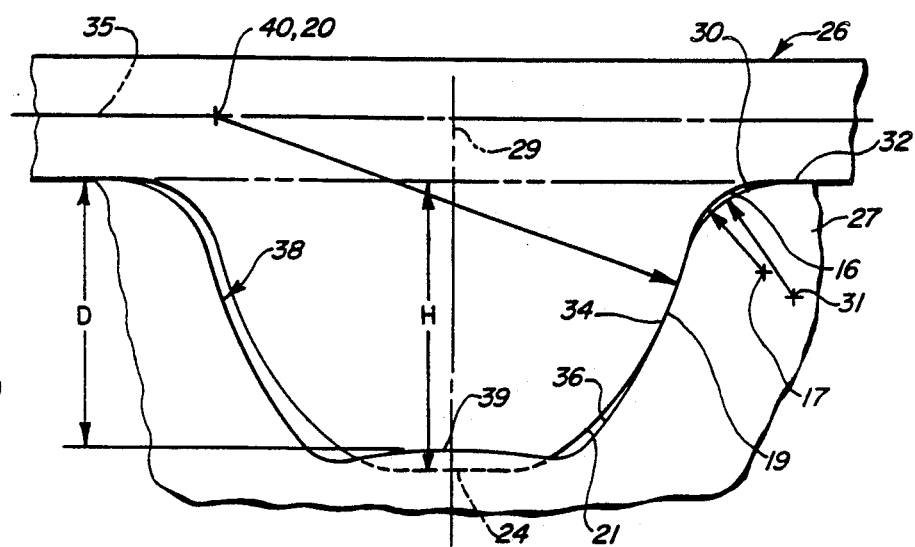
FIG. 3 is a fragmentary side elevation illustrating the meshing of the belt tooth with the pulley.

In the illustrative embodiment of the invention as disclosed in FIGS. 1-3 of the drawing, a power transmission belt generally designated 10 is shown to comprise a toothed power transmission belt having a body 11 and teeth 12 projecting inwardly from the body. Each tooth 12 is symmetrical about a centerline 13. The body defines a longitudinally extending pitch line 14. Conventional tensile cords 15 extend longitudinally of the belt along the pitch line. As shown, tooth axis 13 is perpendicular to the pitch line 14.

As shown in FIG. 1, each half of the tooth at opposite sides of the axis 13 includes a concave root surface 16 defined by an arc of a circle, the radius of which is centered on a point 17. The bottom, or outer end, of the root surface defines a belt land line 18. As shown in FIG. 1, the arc center 17 is spaced inwardly from the belt land line.

A convex power transmitting surface 19 extends inwardly from the root surface 16 and is defined by an arc of a circle having a radius extending from a point 20 on the pitch line 14.

Each tooth further defines a convex tip surface 21 extending inwardly from the power transmitting surface 19. The tip surface is defined by an arc of a circle having a radius centered on a point 22 in the tooth 12 spaced inwardly from the belt land line 18 and from the tooth axis 13, as seen in FIG. 1. The radius of the arc 21 is smaller than the radius of the arc 19, as shown.

The width W of the tooth is considered to be the length of the radius of the arc 19, as shown.

The power transmitting surface 19 defines a first junction 23 with the root surface 16. Junction 23 is spaced inwardly from the belt land line 18 approximately one-fourth the height H of the tooth inwardly from the belt land line 18 to a distal end surface 24 thereof.

The inner end of the power transmitting surface 19 defines a second junction 25 with the tip surface 21. Junction 25 is spaced inwardly from the belt land line 18 in the range of approximately one-half to two-thirds the height H of the tooth.

The power transmission surface 19 is substantially tangent to the tip surface 21 at junction 25.

Referring now to FIG. 2 and 3, the invention comprehends the provision of the belt 10 in a power transmission toothed belt drive generally designated 26, which further includes a pulley generally designated 27 adapted for cooperation with the toothed belt 10 in providing the improved drive system of the invention.

More specifically, as seen in FIG. 2, the pulley defines a plurality of circumferentially radially outwardly opening grooves generally designated 28, each groove being symmetrical about a radial centerline 29. Each groove, at opposite sides of the centerline, includes a convex outer surface 30 defined by an arc of a circle having a radius centered on a point 31. As seen in FIG. 2, surface 30 extends inwardly from a face line 32 defined by the distal face of the land 33 between successive pulley grooves 28.

A concave sidewall surface 34 extends inwardly from the outer surface 30 and is defined by a radius centered on a line 35 coincident with the pitch line 14 of the belt when a belt tooth, such as belt tooth 12, is fully meshed with the pulley in the groove 28, as seen in FIG. 3.

A concave inner surface 36 extends inwardly from the sidewall surface 34 and is defined by an arc of a circle having a radius centered at a point 37 in the groove 28. As shown in FIG. 2, the radius of the arc defining surface 36 is smaller than the radius of the arc defining the sidewall surface 34.

As best seen in FIG. 3, the belt tooth 12 and pulley groove 28 are constructed such that the belt tooth root surface 16 has a clearance with the pulley groove outer surface 30, the belt tooth power transmitting surface 19 has facial engagement with the pulley groove sidewall surface 34, and the belt tooth tip surface 21 has a clearance with the pulley groove inner surface 36 inwardly from the sidewall surface 34, when the belt tooth is fully received in the pulley groove, as seen in FIG. 3, with the belt tooth power transmitting surface at one side of the tooth engaging the pulley groove sidewall surface 34. As further seen in FIG. 3, when thus disposed within the pulley groove, the belt tooth opposite side surface has a clearance with the entire side of the pulley groove surface generally designated 38.

As further shown in FIG. 3, the height H of the belt tooth is greater than the depth D of the pulley groove inwardly from the face line 32 so that when the belt tooth is fully received in the pulley groove, the pulley tooth is placed under radial compression. The amount of compression is indicated in FIG. 3 by the distance between the dotted line showing of the distal belt tooth surface 24 in the undistorted position and the distal, or bottom, surface 39 at the inner end of the pulley groove. As shown in FIG. 2, the pulley groove bottom surface 39 is convex outwardly so that maximum compression of the belt tooth occurs at the centerline 29.

The radius defining arcuate surface 34 is centered on the line 35 at a point 40. Point 40 is substantially coincident with point 20 of the belt, as illustrated in FIG. 3, and thus, the radius of the circle defining the belt tooth power transmitting surface is substantially equal to the radius of the circle defining the pulley groove sidewall surface 34. The invention comprehends that the radius of the circle defining the belt tooth power transmitting surface may be larger than the radius of the circle defining the pulley groove sidewall surface, within the broad scope of the invention.

The radius of the circle defining the pulley groove inner surface 36 is greater than the radius of the circle defining the belt tooth tip surface 21, in the illustrated embodiment.

As further shown in FIG. 3, the point 31, defining the center of the arc 30, is spaced from the face line 32 and from the centerline 29 of the groove a distance greater than the spacing of the point 17 from the belt land line 18 and centerline 13 of the pulley tooth.

Thus, when the tooth 12 is meshed with the pulley, as seen in FIG. 3, a clearance results between the pulley groove outer surface 30 and the belt tooth root surface 16, the belt tooth power transmitting surface 19 is in facial engagement with the pulley groove sidewall surface 34, and a clearance is provided between the belt tooth tip surface 21 and the pulley groove inner surface 36. With such a construction, the drive 26 provides smooth engagement and disengagement between the belt tooth and pulley groove surfaces in the operation of the drive system, while effectively minimizing noise in the operation thereof, including at high loads.

A modified form of toothed belt power transmission drive generally designated 126 is illustrated in FIG. 5. Drive 126 utilizes the toothed belt 10, but includes a modified form of pulley generally designated 127. Pulley 127 is generally similar to pulley 27 but, as shown in FIG. 4, includes a planar surface 141 extending inwardly from the convex outer surface 130. The planar surface is defined by a tangent 142 to a concave sidewall inner surface 136 at a point 143 spaced inwardly from the face line 132 substantially one-half the depth of the pulley groove. As further shown in FIG. 4, the center 131 of the arc defining the convex outer surface 130 is spaced from the face line 132 more than one-half the depth D of the pulley groove.

As seen in FIG. 5, the center 131 of the pulley outer surface arc is spaced from the pulley groove radial centerline 129 and the face line 132 a distance greater than the spacing of the center 17 of the belt tooth concave root surface 16 from the pulley groove radial centerline 129 and the face line 132, respectively.

When the radius of arcuate surface 130 is relatively small, the pulley side surface includes a relatively larger planar surface 141 than when the radius of the pulley surface 132 is larger and a portion of the power transmitting surface 19 of the belt tooth may engage the pulley groove surface 130 at the inner end thereof.

In the drive 126, the power transmitting surface 19 of the pulley tooth may be slightly deformed by its engagement with the planar surface 141 and/or inner end of the arcuate outer surface 130. It has been found that such an engagement between the pulley tooth and surface of the pulley groove also provides for improved smooth engagement and disengagement of the belt tooth with the pulley in the operation of the drive and with minimum noise.

The provision of the belt tooth with a height greater than the depth of the pulley groove effects a compressive engagement of the belt tooth with the bottom of the pulley groove prior to the engagement of the belt land surface 18 with the outer face of the land between the successive pulley grooves, thereby effectively eliminating noise as results in the conventional construction wherein these two surfaces are engaged abruptly.

Further, the controlled facial engagement of the pulley tooth with a portion of the side surface of the pulley groove has been found to provide improved efficiency in the transmission of power.

The provision of the clearance between the belt tooth and the side surface of the pulley groove opposite the side engaged by the belt tooth permits for facilitated flexing of the tooth during movement from the pulley, thereby further providing long, troublefree, low noise life of the drive system. Further, as a result of the elimination of substantial stresses during the engagement and disengagement of the belt tooth with the pulley, cracking at the belt tooth root is effectively minimized.

Referring now to the embodiment of FIG. 6, a further modified form of power transmission drive system 226 is shown to include a drive system generally similar to drive system 26, but wherein an increased extent of the power transmitting surface 219 of the belt tooth is provided by spacing the junction 225 between the power transmitting surface 219 and tip surface 221 of the belt tooth from the face line 232 approximately two-thirds of the height of the belt tooth. As shown in FIG. 6, the width W of the belt tooth is slightly smaller than the width WP of the pulley groove. Further, the width W' between the opposite points 220 on the pitch line 214, on which the power transmitting surfaces 219 at opposite sides of the belt tooth are centered, is less than the width W of the belt.

In the drive 226, the height of the belt tooth is substantially equal to the depth of the pulley groove.

Thus, as shown in FIG. 6, arc centers 220 and 240 are spaced on the pitch line 214, arc centers 222 and 237 are spaced apart relative to the centerline 229, and arc centers 217 and 231 are spaced apart relative to both the face line 232 and the centerline 229.

The drive system 226 has been found to provide improved long, troublefree life, with minimum noise as a result of the provision of the clearances between the root portion of the belt tooth and the confronting outer surface of the pulley groove and the tip surface of the belt tooth and the inner surface of the pulley grove, while yet providing a substantial area of force transmitting engagement between the belt tooth and pulley groove surface intermediate the clearances.

The foregoing disclosure of specific embodiments is illustrative of the broad inventive concepts comprehended by the invention.

We claim:

1. A power transmission toothed belt comprising:
   a belt body defining a longitudinal pitch line; and
   a plurality of longitudinally spaced teeth projecting inwardly from said body, each tooth being symmetrical about a center axis perpendicular to said pitch line, each half of each tooth having
   a concave root surface defined by an arc of a circle, the bottom of the root surface defining a belt land line,
   a convex power transmission surface extending inwardly from said root surface and being defined by an arc of a circle having a radius centered on said pitch
   a convex tip surface extending inwardly from said power transmitting surface and being defined by an arc of a circle having a radius centered in the tooth on the opposite side of the center axis and being smaller than said radius of the circle defining said power transmitting surface such that a portion of the tip surface is radially inside of an extension of the arc of the power transmitting surface,
   a flat distal inner end surface extending transversely to said tooth center axis,
   said power transmitting surface defining a junction with said root surface spaced inwardly from said belt land line approximately one-fourth the height of the tooth inwardly from said belt land line, and said power transmitting surface defining a junction with said tip surface spaced inwardly from said belt land line in the range of approximately one-half to two-thirds the height of the tooth inwardly from said belt land line.

2. The power transmission toothed belt of claim 1 wherein said power transmitting surface is substantially tangent to said tip surface at a junction of said power transmitting surface with said tip surface.

3. A power transmission toothed belt comprising:
   a belt body defining a longitudinal pitch line; and
   a plurality of longitudinally spaced teeth projecting inwardly from said body, each tooth being symmetrical about a center axis perpendicular to said pitch line, each half of each tooth having
   a concave root surface defined by an arc of a circle, the bottom of the root surface defining a belt land line,
   a convex power transmission surface extending inwardly from said root surface and being defined by an arc of a circle having a radius centered on said pitch line, and
   a convex tip surface extending inwardly from said power transmitting surface and being defined by an arc of a circle having a radius centered in the tooth on the opposite side of the center axis and being smaller than said radius of the circle defining said power transmitting surface such that a portion of the tip surface is radially inside of an extension of the arc of the power transmitting surface,
   said power transmitting surface defining a junction with said root surface spaced inwardly from said belt land line approximately one-fourth the height of the tooth inwardly from said belt land line, and said power transmitting surface defining a junction with said tip surface spaced inwardly from said belt land line in the range of approximately one-half to two-thirds the height of the tooth inwardly from said belt land line.

* * * * *